United States Patent Office 3,681,266
Patented Aug. 1, 1972

3,681,266
COPOLYMERS FROM A POLYFLUORO AMIDO SILANE AND A POLYALCOHOL
Elemer Domba, Olympia Fields, Ill., assignor to Nalco Chemical Company, Chicago, Ill.
No Drawing. Filed May 24, 1971, Ser. No. 146,435
Int. Cl. C08f 11/04
U.S. Cl. 260—25          7 Claims

ABSTRACT OF THE DISCLOSURE

Polymeric reaction products formed by reacting a monomer

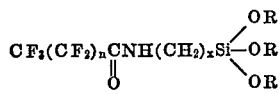

where
$n = 0$–20, and optimum 6
$x = 1$–4 and optimum 3
R = hydrocarbon, lower alkyl preferred and ethyl optimum
with a polyhydric alcohol such as glycerol, sorbitol, pentaerythritol and polyalkyleneoxy adducts. The products have unusual oil and water repellent properties.

---

This application contains subject matter related to Ser. No. 80,118 filed Oct. 20, 1970, Domba, and the matter therein describing preparation and description of the polyfluoro amido silane monomer is hereby incorporated by reference.

The present invention is directed towards solid reaction products of polymeric properties which proceed from the reaction of a novel polyfluoro amido silane monomer and a polyalcohol.

The generalized reaction of a silane ester and a glycol is known in the art, and is illustrated by the following patents:

2,386,793—Hanford (E. I. du Pont de Nemours & Co. (Inc.))
2,441,066—Hanford (E. I. du Pont de Nemours & Co. (Inc.))
2,834,748—Bailey (Union Carbide Corporation)
UK British 892,819—Bailey et al. (Union Carbide Corp.)
Austrian 176,020—Wacker The subject is also discussed in Walter Noll, "Chemistry and Technology of Silicones," pages 371–377 (1968), Academic Press.

The generalized reaction with alcohols and with polyalkylene oxide adducts is set out below:

(1) With alcohols:

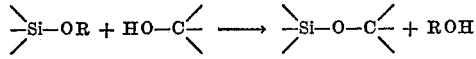

(2) With polyalkylene oxide adducts:

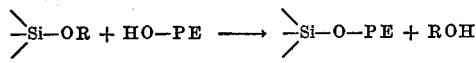

Although the known art above teaches the production of the known basic compounds, the polymers produced from the polyfluoro amido silane monomer of the present application discussed below represent the present quantum of invention.

THE POLYFLUORO AMIDO SILANE MONOMER

The polyfluoro amido silane monomers of the present invention may be represented by the following formula:

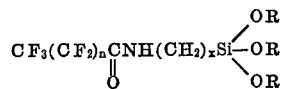

where:
$n$ is 0–20, and is preferably 6;
$x$ is 1–4, and is preferably 3; and
R is a hydrocarbon. It preferably is selected from the group comprising lower alkyl ($C_1$–$C_6$) and is optimally ethyl.

The polyfluoro amido silane monomers may be prepared from a reaction mixture of an alkyl amino substituted silane ester and either:

(1) a perfluoro acid halide, or
(2) a perfluoro alkyl ester.

In either case the mole ratio of the reactants is approximately 1:1.

The alkyl amino substituted silane ester is represented by the structural formula:

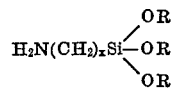

where $x$ and R are identified as given above.
The perfluoro acid halide is represented by the structural formula:

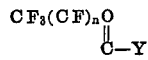

where $n$ is identified as given above and Y is a halide selected from the group comprising Cl⁻, Mr⁻ and I⁻.

The perfluoro alkyl ester is represented by the formula:

$$CF_3(CF_2)_n COOR'$$

where R' is the alkyl selected from the group comprising methyl, ethyl, propyl and butyl.

The reaction mixture in both cases may take place at room temperature and pressure in a time interval of 2–8 hours. The resulting reaction product is the polyfluoro amido silane monomer.

THE POLYALCOHOL COMPONENT

The polyfunctional alcohol or polyalcohol component of the reaction may be selected from polyalcohols, preferably aliphatic such as sorbitol, pentaerythritol and glycerol. The heptane sugar alcohols exemplified by sorbitol are described in The Encyclopedia of Chemical Technology, 2d ed., (ECT II), 1 (1963), pp. 569–588, especially page 570. Additionally, it has been found that preferred reactants are polyalkylene oxide adducts of these alcohols such as the propylene oxide adduct of glycerine (e.g., THANOL F-3000, G-1005 of the Jefferson Chemical Company, Houston, Texas). THANOL F-3000 is defined as a trifunctional propylene oxide adduct of glycerine with a molecular weight of about 3000 (from "Urethane Chemicals," Jefferson Chemical Co., Inc., 1964). Additionally, the propylene oxide adduct of sorbitol is a preferred reactant, e.g., THANOL RS–500, which is defined in the Jefferson Chemical Company publication above as a propylene oxide adduct of sorbitol with a molecular weight of about 500. Additionally, there may be utilized derivatives where the alkylene oxide adduct has been previously partially esterified as in esters of polyalkylene oxide of sorbitol which are then utilized as the reactant. These latter partial esters are defined to be encompassed by the term "alkylene oxide adduct" above.

In general, polyhydroxy alkanes and polyhydroxy alkenes may be utilized.

STRUCTURE OF FORMED POLYMER

The reaction products of this invention rapidly form high molecular weight products which are readily dissolvable in standard solvents such as lower alkanols, for example, isopropanol. The present polymers exhibit unusual oil repellancy, in some cases reaching a value of 6 at 0.05% and 5 at 0.02%. This oil repellancy is due to the polyether portion of the polymer as opposed to the hydrophobic qualities of the siloxane portion of the polymer and the formation of the siloxane Si—O—C bridge by condensation from the silane ester monomer.

The molar ratios of the monomer reactants may be varied within rather large ranges. Where the reactants are equi-functional (as 3—3) the effective monomer ratios for polyol:silane ester range from about 1:100 to 100:1 with preferred 1:10 to 10:1. The reaction temperature utilized in forming the polymer is at a moderately raised temperature in the range of about 140° C.–180° C.

OIL REPELLANCY TEST

Compositions taught in the prior art relating to imparting water and oil repellancies to solid materials have been limited to polyfluoracrylates. The polyfluoroacrylates are completely water insoluble. In comparing the compositions taught by this invention with the polyfluoroacrylates commercially available, the instant invention composition was far superior. The various products were compared by subjecting them to oil and water repellancy tests.

The oil repellancy test is a standard test found in the technical manual of the American Association of Textile Chemists and Colorists, volume 44, September 1968, published by Howes Publishing Company, Inc., New York, N.Y. The test is designed for evaluating the fabric's resistance to wetting by a selected series of liquid hydrocarbons of different surface tensions. The higher the oil repellancy rating, the better resistance to staining by oily materials, especially liquid oily substances. Drops of standard test liquids, consisting of a selected series of hydrocarbons with various surface tensions were placed on the fabric surface and observed for wetting. The oil repellancy rating is the highest number test liquid which does not wet the fabric's surface. Wetting of the fabric is normally evidenced by a darkening of the fabric at the liquid fabric interface.

Water repellancy as measured by the spray test is also a standard test and can be found in the same technical manual described for the oil repellancy test. It measures the resistance of fabrics to wetting by water. Water sprayed against the taut surface of a test specimen under controlled conditions produces a wetted pattern whose size depends on the relative repellancy of the fabric. Evaluation is accomplished by comparing the wetted pattern with pictures on a standard chart. The higher the spray rating, the better the water repellancy of the surface. A rating of 70 indicates partial wetting of the surface. Ratings of 70 and above are regarded as good water repellants.

Oil and water repellancy tests were conducted in accordance with the procedures described above. All samples coated comprised uniform worsted natural flannel with an oil content of less than ½%.

Example Ia $CF_3(CF_2)_6CONH(CH_2)_3Si(OEt)_3$ was heated under vacuum with glycerol to 145° C. A heavy oil formed which was recovered and dissolved in isopropanol. The isopropanol solution was then diluted with water containing emulsifiers and tested on fabrics. On wool, for example, the oil repellancy was 6 at 0.05% and 5 at 0.02%.

Example Ib

The procedure of Example Ia was modified by substituting a propylene oxide adduct of glycerine for the glycerine reactant.

Example Ic

The procedure of Example Ia above was utilized but the propylene oxide adduct of sorbitol was utilized.

Example II 0.1 mole of formula:

where.

$$n = 5 \text{ or } 7$$

was placed in a three-neck flask fitted with a short reflux condenser and stirrer. One mole of glycerine was added and the mixture heated under vacuum to 140–160° C. for a period of time to produce the formation of a homogenous heavy oil.

Example III

The general procedure of Example II was repeated by using pentaerythritol as the polyhydroxy reactant instead of glycerine. In this case the mixture was heated to about 180° C. The pentaerythritol slowly melted and the mixture solidified. Heating was discontinued and the solid mixture was cooled to about 50–60° C. and the solid resinous material was then dissolved in isopropanol.

The embodiments of the invention in which an exclusive property or privilege is claimed are defined as follows:

1. A polymeric reaction product obtained by reacting at moderate temperatures of about 140° C.–180° C. a polyfluoro amido silane monomer represented by the formula:

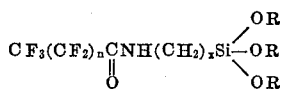

where:
n is 0–20;
x is 1–4; and
R is a hydrocarbon
with an aliphatic polyalcohol selected from the group consisting of heptane sugar alcohols, pentaerythritol, glycerol and their polyalkylene oxide adducts.

2. The product of claim 1 wherein the polyalcohol reactant is glycerol.

3. The product of claim 1 wherein the polyalcohol reactant is sorbitol.

4. The product of claim 1 wherein the polyalcohol reactant is pentaerythritol.

5. The product of claim 1 wherein the polyalcohol reactant is the polypropylene oxide adduct of glycerine.

6. The product of claim 1 wherein the polyalcohol reactant is the polypropylene oxide adduct of sorbitol.

7. The product of claim 1 wherein the silane monomer has a structure where n is 6, x is 3 and R is ethyl.

References Cited

UNITED STATES PATENTS 3,597,457  8/1971  Robinson et al. _____ 260—404

DONALD E. CZAJA, Primary Examiner

M. I. MARQUIS, Assistant Examiner

U.S. Cl. X.R.

117—139.5 A, 1161 ZA; 260—46.5 E, 46.5 P, 404, 448.8 R